United States Patent [19]

Schreck

[11] 4,357,440

[45] Nov. 2, 1982

[54] WET-ADHESION AID

[75] Inventor: David J. Schreck, Charleston, W. Va.

[73] Assignee: Union Carbide Corporation, Danbury, Conn.

[21] Appl. No.: 158,221

[22] Filed: Jun. 10, 1980

Related U.S. Application Data

[62] Division of Ser. No. 74,083, Sep. 10, 1979, abandoned.

[51] Int. Cl.[3] .............................................. C08L 33/00

[52] U.S. Cl. .................................... 524/535; 524/529; 524/533

[58] Field of Search ................ 260/29.6 TA; 560/222; 524/529, 533, 535

[56] References Cited

U.S. PATENT DOCUMENTS

| | | | |
|---|---|---|---|
| 3,356,627 | 12/1967 | Scott | 260/29.6 |
| 3,514,473 | 5/1970 | McFadden et al. | 260/347.4 |
| 3,720,656 | 3/1973 | Manaka | 260/89.5 N |
| 4,176,103 | 11/1979 | Cruden et al. | 260/29.6 TA |

*Primary Examiner*—John Kight, III
*Assistant Examiner*—Amelia B. Yarbrough
*Attorney, Agent, or Firm*—William E. Dickheiser

[57] ABSTRACT

A new compound, 2-hydroxy-3-t-butylamino-1-propyl methacrylate, and latex coating compositions containing said compound as a wet-adhesion aid.

2 Claims, No Drawings

WET-ADHESION AID

This application is a division of Ser. No. 74,083, filed Sept. 10, 1979, now abandoned.

BACKGROUND OF THE INVENTION

The use of latex paints has increased greatly because of the many advantages which latex paints exhibit over oil-based paints and other coatings. Many such latex paints have been formulated and the literature is replete with references describing formulations used.

One problem often encountered when latex paints are used is the tendency for the latex paint to blister and peel when the substrate coated with the latex paint is exposed to conditions of high humidity. In response to this problem, the formulators of latex coatings have added to the coatings compounds termed wet-adhesion aids which improve the adhesion of the latex coating to the substrate.

A number of such wet-adhesion aids have been used in latex coatings and many are listed in U.S. Pat. No. 3,356,627. Among the wet-adhesion aids most frequently used one can mention t-butylaminoethyl methacrylate, 4-vinylpyridine, latexes treated with ethylene imine, and polyethylene imine which has been further treated with epichlorohydrin.

These materials are very expensive. Furthermore the compositions requiring ethylene imine are disadvantageous because of the known carcinogenicity of ethylene imine. Still, further, t-butylaminoethyl acrylate is a liquid and undergoes intra- as well as intermolecular aminolysis reactions to form materials which impart no wet-adhesion to the latex. Although the 4-vinylpyridine monomer is relatively stable to degradation, it provides inferior wet-adhesion to that of t-butylaminoethyl methacrylate.

Because of the very extensive use of latex coatings and due to such disadvantages as cost, toxicity, degradability and suboptimal performance of the known wet-adhesion aids any material which can act as an effective wet-adhesion aid while overcoming the disadvantages of those heretofore available would be of great advantage.

SUMMARY OF THE INVENTION

It has now been found that 2-hydroxy-3-t-butylamino-1-propyl methacrylate is an effective wet-adhesion aid for latex coatings. This compound exhibits increased adhesion over the known and frequently employed wet-adhesion aids while overcoming to a large extent some of their disadvantages.

DESCRIPTION OF THE INVENTION

This invention is the compound 2-hydroxy-3-t-butylamino-1-propyl methacrylate. This invention also contemplates latexes and latex paints formulated with this compound and the use of this compound as a wet-adhesion aid for the latexes and latex paints. Other primary amine adducts of glycidyl methacrylate could also be useful as wet-adhesion aids.

The compound 2-hydroxy-3-t-butylamino-1-propyl methacrylate can be readily produced by the reaction of glycidyl methacrylate and t-butylamine. In the reaction one mole of the methacrylate reacts with one mole of the amine; however, one can, if desired, have an excess of either of the reactants present.

The reaction is carried out at a temperature of from about 10° C. to about 100° C., preferably from about 30° C. to about 70° C. Ambient reactor pressure can be used, or, if one wishes, an elevated pressure up to about 80 psi. Pressure is not a significant factor.

The reaction may proceed uncatalyzed or a catalyst may be employed. Any effective catalyst known to those skilled in the art may be used.

The reaction can be carried out either with or without a solvent, preferably in a solvent and illustrative of the many solvents suitable for use in this synthesis one can name the alcohols, tetrahydrofuran, acyclic ethers, and conventional acetate esters.

The preferred solvents are the alcohols such as isopropyl alcohol or t-butyl alcohol.

The time of the reaction will vary and is dependent to some extent on the reaction components and conditions chosen and the size of the run.

As previously indicated 2-hydroxy-3-t-butylamino-1-propyl methacrylate can be used as a wet-adhesion aid for aqueous latex coatings compositions. It is generally added to the latex during the polymerization reaction, though in some instances it can be dissolved and added after completion of the reaction. Incorporation can be in any of the known polymer latexes among which one can name those based on methyl methacrylate and acrylic esters, vinyl acetate and higher esters, isoprene, styrene and butadiene, styrene-butadine and acrylic acids, styrene-butadiene and vinylpyridine, butadiene and acrylonitrile, chloroprene and acrylonitrile, vinylidine chloride and acrylonitrile and isobutylene and isoprene. The preferred are the so-called acrylic latexes, i.e. those based on methyl methacrylate and acrylic ester, the so-called SBR latexes, i.e. those based on styrene and butadiene and the so-called vinyl acetate polymer latexes, i.e. those based on vinyl acetate and higher esters.

The 2-hydroxy-3-t-butylamino-1-propyl methacrylate is incorporated into the latex at a concentration of from about 0.1 weight percent to about 10 weight percent, preferably from about 0.5 weight percent to about 5 weight percent based on the total weight of the latex. The latexes may also contain other compounds normally used by those skilled in the art of latex formulation in their normal and usual concentrations. These compounds can be any of the conventional surfactants such as stabilizers, preservatives, thickeners, antifoaming agents, dispersants, coalescing aids and other compounds well known to those skilled in the art.

The latexes produced containing the improved wet-adhesion aid of this invention are used in producing coatings formulations by the known conventional procedures. The coatings obtained display a marked increase in adhesive properties over those formulated without adhesion aids and those formulated with adhesion aids previously used to enhance the adhesion of latex paints to substrates. It was completely unexpected to find that the 2-hydroxy-3-t-butylamino-1-propyl methacrylate would effect such a pronounced improvement in the wet-adhesion properties.

In addition there are several other advantages to the use of 2-hydroxy-3-t-butylamino-1-propyl methacrylate as a wet-adhesion aid in latex paints. The compound can be made from starting materials which are less expensive than those used to produce the heretofore available wet-adhesion aids. Furthermore, because some wet-adhesion aids are synthesized using known carcinogenic materials the use of the wet-adhesion aid of this invention results in a safety benefit since, to our present knowledge, the starting materials used to produce 2-hydroxy-3-t-butylamino-1-propyl methacrylate are not considered carcinogens. Still further, because the wet-adhesion aid of this invention is a solid it is more stable and less prone to degradation reactions during transport and storage than some of the known wet-adhesion aids.

Thus, by use of this compound as a wet-adhesion aid in latex based coatings, very advantageous technical, economic and health-related results are obtained.

The following examples serve to further illustrate the invention.

EXAMPLE 1

There were charged to a glass pressure reactor having a volume of 250 ml, 30 ml of isopropyl alcohol, 20 grams of 90 percent pure glycidyl methacrylate and 9.92 grams of t-butylamine. The reactor was then placed in a water bath at 60° C. for 3.5 hours. Thereafter the solution was cooled in an ice bath, and a white, crystalline precipitate formed, which weighed 17.7 grams after drying. The filtrate was partially concentrated and a second filtration gave an additional 1.3 grams of the same white, crystalline solid product. This yield equalled about 70 percent based on the amount of glycidyl methacrylate charged. The melting point of this solid product was 66°-67° C. The structure of the 2-hydroxy-3-t-butylamino-1-propyl methacrylate produced was further confirmed by nuclear magnetic resonance, infrared analysis and mass spectroscopy.

EXAMPLE 2

Part A: Production of latexes

There were charged to a three liter resin kettle equipped with a stirrer, thermometer, dropping funnel and reflux condenser, and placed in a 65° C. constant temperature bath, 414 grams of water, 2 grams of sodium bisulfite and 2 grams of 0.006 molar ferric chloric solution. Thereafter a monomers mixture composed of 220 grams of butyl acrylate, 176 grams of methyl methacrylate, 4 grams of acrylic acid and 0.4 gram of Ca—ϕ—O—$(EO)_4$—H as surfactant was fed to the resin kettle over a two hour period. Simultaneous with the monomer feed a catalyst feed composed of 4 grams of ammonium persulfate dissolved in 255 grams of water was begun at a rate of 60 grams per hour. One hour after the simultaneous commencement of the monomer and catalyst feeds a surfactant feed composed of 13.3 grams of sodium dioctyl sulfosuccinate and 14.3 grams of Ca—ϕ—O—$(EO)_{40}$—H dissolved in 250 grams of water was begun at a rate of 92.5 grams per hour. When the initial monomer mixture was depleted, the kettle contents were adjusted to a pH of 6 by the addition of ammonium hydroxide and a second monomer mixture composed of 220 grams of n-butyl acrylate, 164 grams of methylmethyacrylate, 16 grams of the 2-hydroxy-3-t-butylamine-1-propyl methacrylate produced in Example 1 as a wet-adhesion aid and 0.4 gram of Ca—ϕ—O—$(EO)_4$—H was fed to the kettle over a period of 110 minutes. When this second monomer mixture feed was complete the reaction mixture was stirred for an additional hour at 65° C. and then cooled. (Latex I)

For comparative purposes three other latexes were manufactured using the above described procedure. One latex was manufactured without the incorporation of a wet-adhesion aid (Latex II) and the other two latexes were manufactured with the substitution of 16 grams of 4-vinylpyridine (Latex III) and 16 grams of t-butylaminoethyl methacrylate (Latex IV) for the wet-adhesion aid used above.

Part B: Production of paint compositions

A pigment paste was prepared by combining in order with slow stirring 3600 grams of propylene glycol, 360 grams of dispersant, 80 grams of defoamer and 11,000 grams of titanium dioxide then subjecting the mixture to high speed shear for 15 minutes.

A semi-gloss latex paint was prepared using the pigment paste prepared above and Latex I formulated with 2-hydroxy-3-t-butylamine-1-propyl methacrylate as a wet-adhesion aid, with the compounds and in the amounts shown in Table I.

TABLE I

| Component | Parts by weight |
|---|---|
| Pigment Paste | 376 |
| Latex I | 528.5 |
| Plasticizer | 15 |
| Surfactant | 3 |
| Defoamer | 1 |
| 2.5% Hydroxyethyl Cellulose Thickner | 70 |
| Water | 79.6 |
| Mildewcide | 1 |
| Sodium dioctyl sulfosuccinate | 1 |
| Aqueous ammonium hydroxide | 14 |

For comparative purposes, three other latex paints were prepared using the same formulation shown in Table I, but substituting, respectively Latexes II to IV.

The four latex paints thus produced were evaluated using the following procedures:

A 6 inch by 12 inch steel panel was primed and coated with an alkyd gloss enamel and then allowed to dry for seven days at constant ambient pressure and humidity. The latex paint composition prepared using Latex I was painted over the gloss enamel using a 6 mil drawndown bar and allowed to dry under the same conditions of constant temperature and humidity. The panel was then immersed in distilled water for three hours and upon removal was covered with cheesecloth which was saturated with water. The cheesecloth was folded back to expose an area 1.5 inches wide across the panel. The exposed area was wiped dry and immediately thereafter three 1-inch-diameter stainless steel cylinders containing a threaded well on the top were glued to the panel equally spaced across the dried exposed area. The cylinders were glued by placing two drops of glue on the panel where the cylinder was to be mounted, placing the cylinder on the glue, applying finger pressure to the cylinder until the glue oozed from underneath the cylinder completely around its base and then placing a 500 gram weight on top of the cylinder for 5 minutes. The remaining cheesecloth was removed from the panel. The panel was dried and three more cylinders were glued to the panel using the above-described procedure.

By use of a sharp pointed knife, the coating was cut around each cylinder circumference down to the metal substrate. The test panel was bolted on an Instron stress-stain tensile testing instrument and a threaded cable was attached to the first cylinder and the force required to pull the cylinder free from the panel was determined. Following this procedure the force required to free each of the other five cylinders was determined. The results of the six determinations were averaged.

For comparative purposes the other three latex paint compositions produced with the Latexes II to IV were evaluated in the same manner described above and the averages of the six tests for each paint are shown in Table II.

TABLE II

| Latex Paint Formulated With Indicated Wet-Adhesion Aid | Force (psi) |
|---|---|
| None (Control) (Latex II) | 3.7 |
| 4-Vinyl Pyridine (Latex III) | 39.2 |
| t-Butylaminoethyl methacrylate (Latex IV) | 64.3 |
| 2-Hydroxy-3-t-butylamino-1-propyl methacrylate (Latex I) | 88.9 |

The results establish that 2-hydroxy-3-t-butylamino-1-propyl methacrylate is a better wet-adhesion aid for latex paints and demonstrates the advantageous results obtained over those obtained by use of equal quantities of two of the conventional, heretofore used wet-adhesion aids. The latex paint formulated with 2-hydroxy-3-t-butylaminoethyl-1-propyl methacrylate as a wet-adhesion aid had an adhesion over 24 times greater than that of the latex paint formulated without a wet-adhesion aid and had an adhesion about 2.2 times and 1.4 times greater than the latex paints formulated with 4-vinyl pyridine and t-butylaminoethyl methacrylate, respectively, as wet-adhesion aids.

What is claimed is:

1. In a latex coating composition, the improvement of having present therein as a wet-adhesion aid from 0.1 to 10 weight percent of 2-hydroxy-3-t-butylamino-1-propyl methacrylate, based on the weight of the latex.

2. The improved latex coating composition as claimed in claim 1 wherein the 2-hydroxy-3-t-butylamino-1-propyl methacrylate is present at a concentration of from 0.5 to 5 weight percent.

* * * * *